(12) United States Patent
Isoda et al.

(10) Patent No.: US 6,515,580 B1
(45) Date of Patent: Feb. 4, 2003

(54) ANTITHEFT DEVICE FOR VEHICLES

(75) Inventors: Naoya Isoda, Mori-machi (JP);
Masahiko Enoyoshi, Mori-machi (JP);
Masayuki Yamamoto, Mori-machi (JP)

(73) Assignee: Kabushiki Kaisha MORIC, Mori-machi (JP)

( * ) Notice: Subject to any disclaimer, the term of this patent is extended or adjusted under 35 U.S.C. 154(b) by 0 days.

(21) Appl. No.: 09/692,837

(22) Filed: Oct. 20, 2000

(30) Foreign Application Priority Data

Jul. 26, 2000 (JP) ........................................ 2000-225002

(51) Int. Cl.[7] ................................................ B60Q 1/00
(52) U.S. Cl. ..................... 340/425.5; 340/426; 340/427; 307/10.2; 307/10.3; 429/7

(58) Field of Search ................................. 429/7, 8, 150, 429/178; 307/9.1, 10.1, 10.2, 10.3; 340/425.5, 426, 427, 649, 636

(56) References Cited

U.S. PATENT DOCUMENTS 5,124,565 A * 6/1992 Yoshida et al. ............... 307/9.1
5,498,486 A * 3/1996 Gatehouse ..................... 429/7

* cited by examiner

*Primary Examiner*—Daryl Pope
(74) *Attorney, Agent, or Firm*—Ernest A. Beutler

(57) ABSTRACT

An improved antitheft system for a vehicle wherein the antitheft control unit and the ignition control unit share a common CPU as one method of avoiding external connections that could be jumped by an unauthorized user.

7 Claims, 6 Drawing Sheets

ANTITHEFT DEVICE FOR VEHICLES

BACKGROUND OF THE INVENTION

This invention relates to an antitheft device for vehicles and more particularly to an improved antitheft device that avoids bypassing or disabling of the antitheft system and which offers a lower cost.

Conventionally, vehicles employ in addition to electronic ignition controls, other ECU operated devices that function to provide antitheft protection. These are generally utilized in conjunction with a special key that has a sending unit that sends an identification code to a unit on the vehicle so that the vehicle can confirm that a licensed or authorized user is attempting to start or operate the vehicle. Although these systems have a high degree of utility, the antitheft system normally uses a control unit or ECU that is separate from the ECU of the ignition system for the vehicle. Thus, there are external connections between the two units. When an external connection is employed, this gives rise to the possibility of a person being able to defeat the antitheft system. In addition it increases the overall cost.

This type of problem can be best understood by reference to FIGS. 1, 2 and 3 which show antitheft systems of the prior art types that are employed with vehicles such as a small vehicle like a motor scooter or motorcycle.

FIG. 1 is a side elevational view of a small vehicle of the type with which the prior art type of antitheft unit has been employed and which is, in the illustrated example, a motor scooter, indicated generally by the reference numeral 11. The motor scooter 11 includes a body frame assembly 12 that rotatably journals a rear wheel 13 and a dirigible front wheel 14, the latter of which is controlled by a handle bar assembly 15. A rider sits on a seat 16 and controls the vehicle from this location.

The vehicle includes a powering internal combustion engine, indicated generally by the reference numeral 17 and which is of the spark ignited type that includes an ignition coil 18 which is controlled by a CDI ignition control unit 19 that includes an ECU that operates on any type of known strategy. The CDI ignition control unit is enclosed within the body frame assembly to improve security.

The unit includes a main switch 21 that is switched by a suitably coded key with the coding being interrelated to an antitheft unit 22, in a manner, which will be described shortly, for controlling the operation of the vehicle 11. The main switch 21 includes an antenna that receives signals from a transponder carried on the key so as to determine if an authorized user is operating the vehicle or not. Alternately the antenna may be mounted elsewhere on the vehicle, preferably enclosed by the body frame assembly 12 for security reasons. An indicator 24 may be mounted on the handle bar assembly 15 so as to be viewed by the operator seated on the seat 16. This shows the antitheft status.

The vehicle also includes a battery 25 that provides electrical power including power for the starting of the engine 17 by means of a starter motor 26 under the operation of the main switch 21.

An alarm 27 is also associated to provide an audible warning under certain conditions as well as a tilt sensor 28 that determines if the vehicle is being moved without an authorized user.

The units shown in FIG. 1 are those, as has been previously noted, of a conventional system and this conventional system generally falls into one of two categories. The first of these categories is shown schematically in FIG. 2 that constitutes a schematic electrical diagram. In this diagram, only the non-grounded terminal of the battery P and its connections to the various components are illustrated. The main switch 21 is positioned in a line L2 that has connection both to the ignition control unit 19 at R1 and via the line L3 and a connection via a connector Q2 to the antitheft unit 22. Thus, when the main switch 21 is closed, both the antitheft unit 22 and ignition unit 19 are enabled. A further line L1 continuously connects the battery 25 and its terminal T to the antitheft unit through a direct connection Q1.

A line from the main line L2 and controlled by the main switch 21 contains a normally open solenoid operated switch 29 which is energized when the antitheft unit 22 determines that a registered user is using the vehicle, in a manner which will be described, and permits energization of the starter motor 26 to provide starting. The ignition unit 19 then supplies electrical power to the coil 18 and an associated spark plug 31 of the engine 17 for permitting its operation.

The antenna 23 will receive a signal from an owner identification device such as a key 32, which has a transponder that outputs a coded signal to the antitheft unit 22 through a connector Q3. As long as the antitheft unit 22 determines that there is an appropriate user, then the antitheft 22 actuates the solenoid switch 29 through a connection Q7 to the line L2 and the engine can be started and operated.

If, on the other hand, there is an attempt to steal the vehicle either by the use of improper key or by the determination by the tilt sensor 28 that the vehicle 11 is being moved by other than an authorized user, then the antitheft unit 22 receives a signal at the terminal Q4 and disables the starter motor 26 by opening the solenoid switch 29. Also, the alarm 27 is sounded and it may be a sound and/or flashing of the turn signals or other units of the vehicle 11. In addition, the antitheft unit 22 outputs a signal to a display or indicator 24 so as to confirm that the operation is either normal antitheft operation or a condition exists where a theft of the vehicle is being attempted. The method by which the attempted theft is determined can be of any suitable type.

The problem with this type of system is that because the antitheft unit 22 and ignition unit 19 are separate, they have a number of external connections between them, which this permits a person to bypass the antitheft unit 22. For example, a thief may bypass the relay operated switch 29 by using a jumper cable L5 (shown in phantom) between the terminals to the starter motor 26 and the terminal Q2 and line L2 downstream of the main switch 21. Then, the vehicle can be operated without permission and can be stolen.

FIG. 3 shows another prior art type of antitheft unit, which also has the disadvantages of failing to provide adequate antitheft protection due to the use of the separate antitheft unit 22 and ignition control unit 19 and associated external terminals. It also has the added cost of requiring two, separate CPUs.

In this construction, the components are basically the same as and thus have been identified by the same reference numerals as applied in FIG. 2. In this arrangement, the main switch 21 is again placed in the line L2 but in this instance, the line L2 is connected only to the antitheft unit 22 through an external terminal Q1. This unit includes an internal switch 41, which connects the electrical power from the line L2 to a terminal R1 of the ignition control unit 19 via an external conductor L5.

When the proper key is utilized, the switch 41 is closed and then the ignition unit is enabled so that the engine 17 can be operated. In this unit, a line L4 goes directly from the line L2 downstream of the main switch 21 to the starter motor 26 so that the starter motor will be energized when the main switch is operated. However if the proper, authorized key is not utilized the engine 17 will not start because the spark plug 31 will not be fired.

With this type of unit, if a theft is detected in any of the known manners including those previously mentioned, the theft alarm 27 is enabled and the ignition control unit is switched off by opening the switch 41. Thus, theft is prevented.

However, again because of the use of the external terminals, a thief can put a jumper line L6 (shown in phantom) between the battery terminal P and the conductor R1 of the ignition control unit and in essence disable the theft prevention.

Thus, it is should be apparent from the foregoing description of the prior art systems where the antitheft unit and ignition unit are separate from each other and controlled by separate CPUs that have external connections to each other, a thief can easily disable the antitheft protection and steal the vehicle.

It is, therefore, a principal object to this invention to provide an improved antitheft unit for a vehicle wherein the theft of the vehicle can be precluded.

SUMMARY OF THE INVENTION

This invention is adapted to be embodied in antitheft unit for a motor vehicle that has a prime mover controlled by a CPU function and a theft detection control by a CPU function. The CPU functions are performed in such a way that there are no external terminal connections that can be jumped so that antitheft protection is possible.

In a preferred embodiment, a single CPU performs the CPU functions so that the cost can be reduced.

In further feature of a preferred embodiment, the single CPU performs the CPU functions at different times so that the single CPU can be made simpler and less costly.

DETAILED DESCRIPTION OF THE PREFERRED EMBODIMENT OF THE INVENTION

Figure 1:
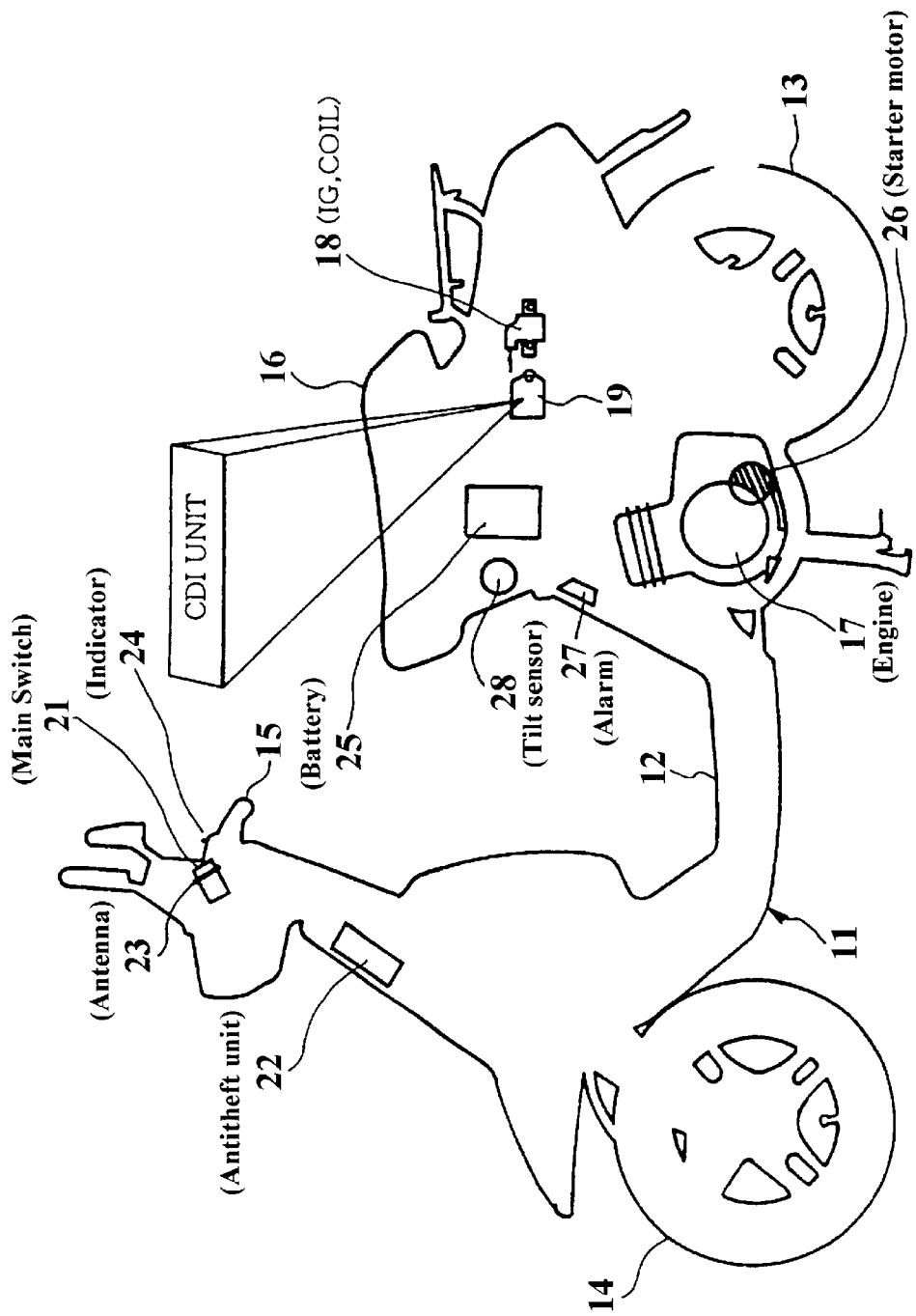
FIG. 1 is a side elevational view, in partially schematic form, of a motor vehicle having a conventional prior art type of antitheft and CDI ignition control unit, each controlled by a separate CPU.
Figure 2:
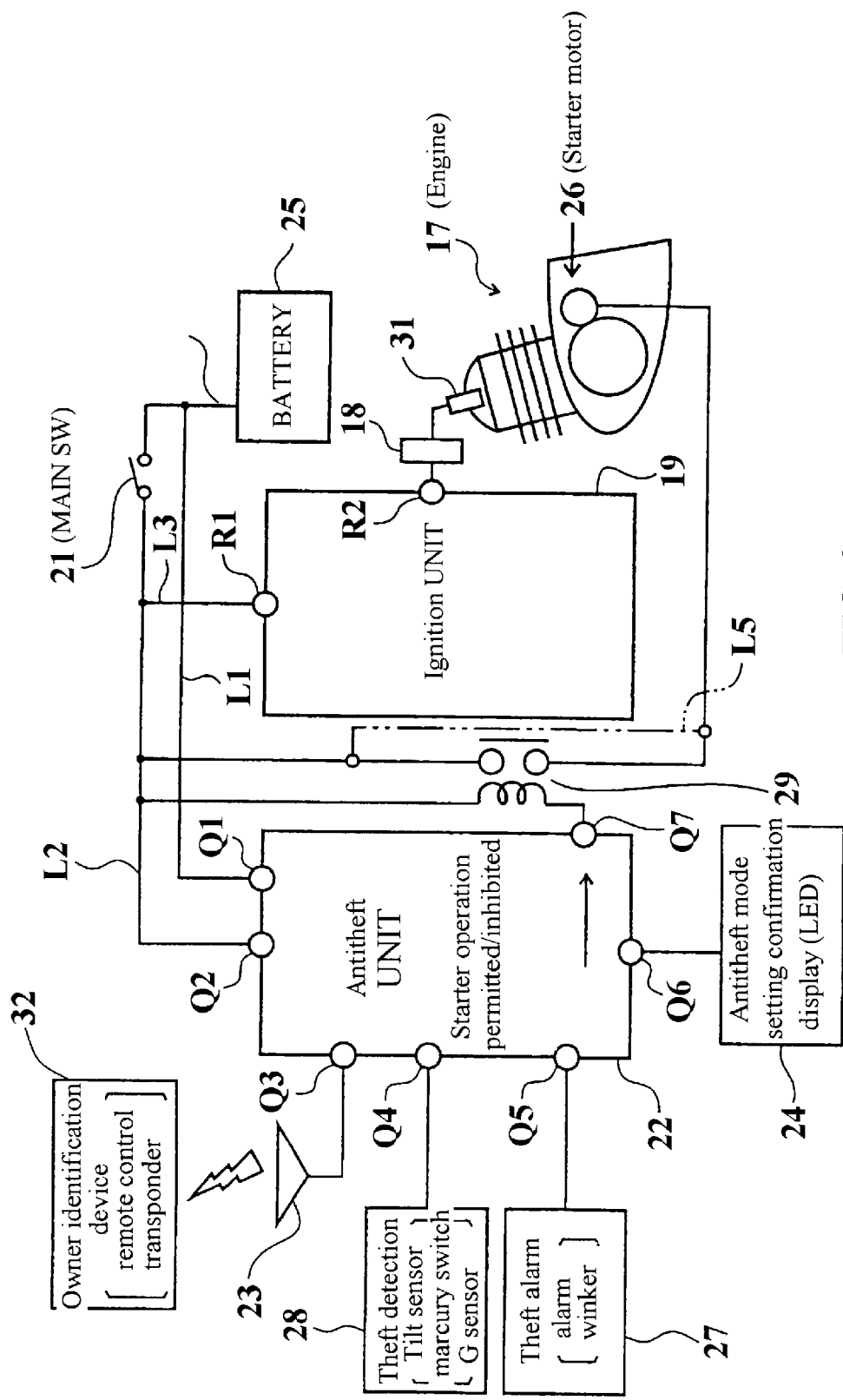
FIG. 2 is a schematic electrical diagram of a first type of prior art type of antitheft unit where there are external connections between the antitheft unit and the ignition unit.
Figure 3:
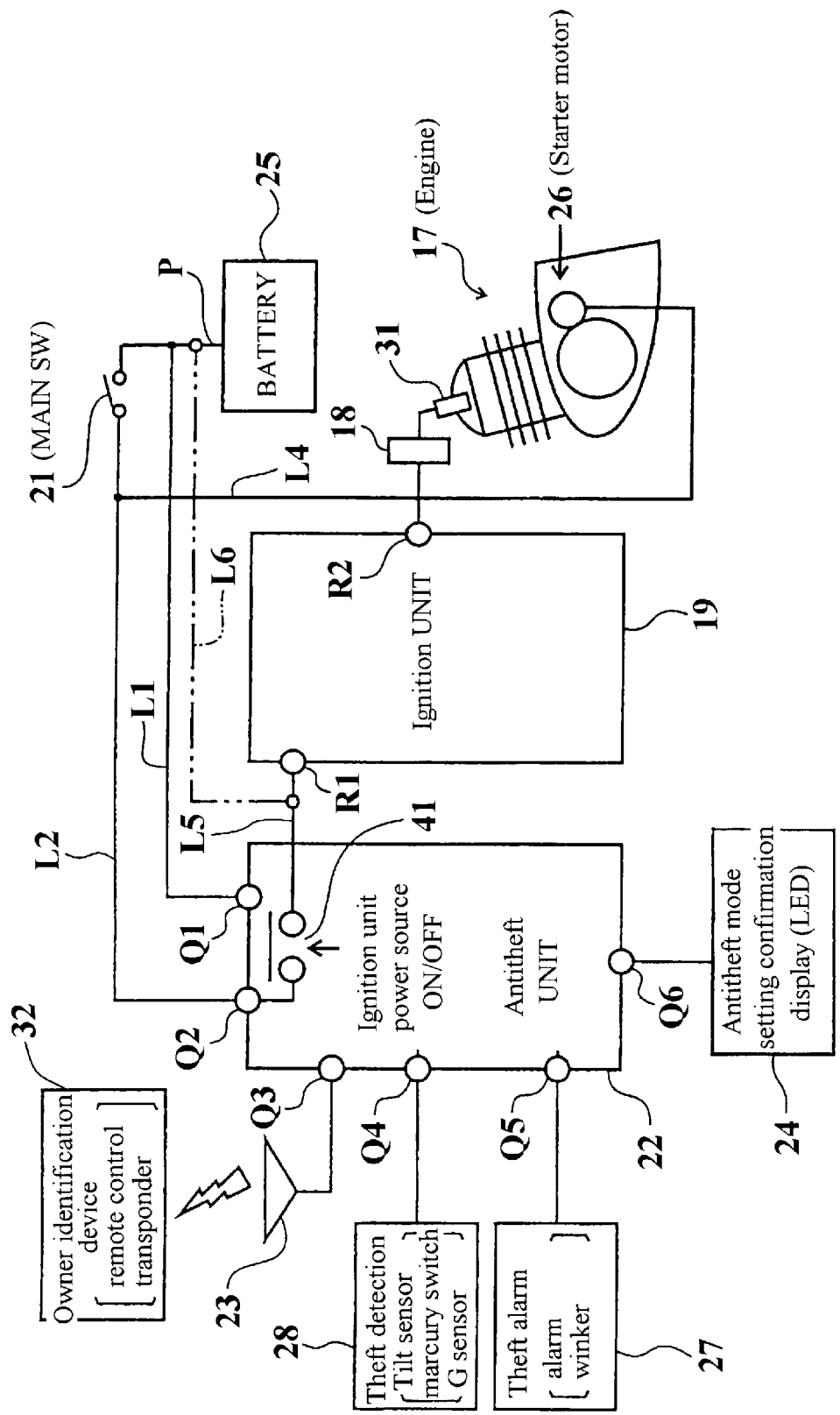
FIG. 3 is a schematic electrical diagram for another type of prior art system that also employs separate electrical connections between the antitheft CPU and the capacitor discharge ignition unit CPU.
Figure 4:
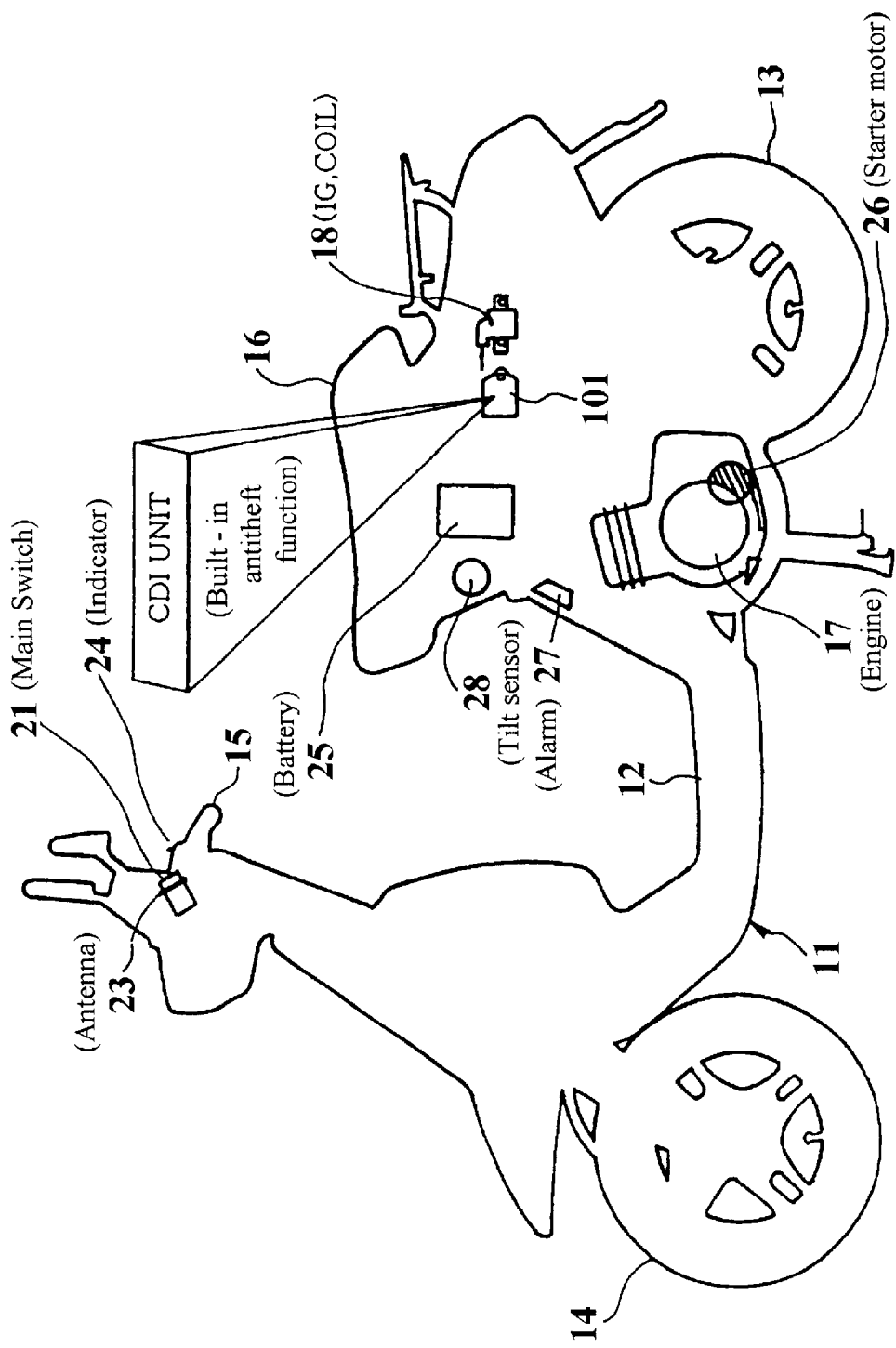
FIG. 4 is a side elevational view in partially schematic form, in part similar to FIG. 1, but showing the antitheft unit in accordance with the invention.

In as much as the vehicle embodying the invention has the same general components as the prior art type of vehicle, where those components are the same they have been indicated by same reference numerals. The primary difference between this invention and the prior art construction is that the control unit, indicated here by the reference numeral 101 provides both control for the CDI unit and the antitheft unit. In this way and by utilizing, in the preferred embodiment, a single CPU for controlling both the ignition and antitheft circuits it is not necessary to utilize separate controls and, therefore, no external connections are required. This avoids the possibility of a theft occurring by someone using a jumper cable between these external connections. Also the cost can be reduced.

Figure 5:
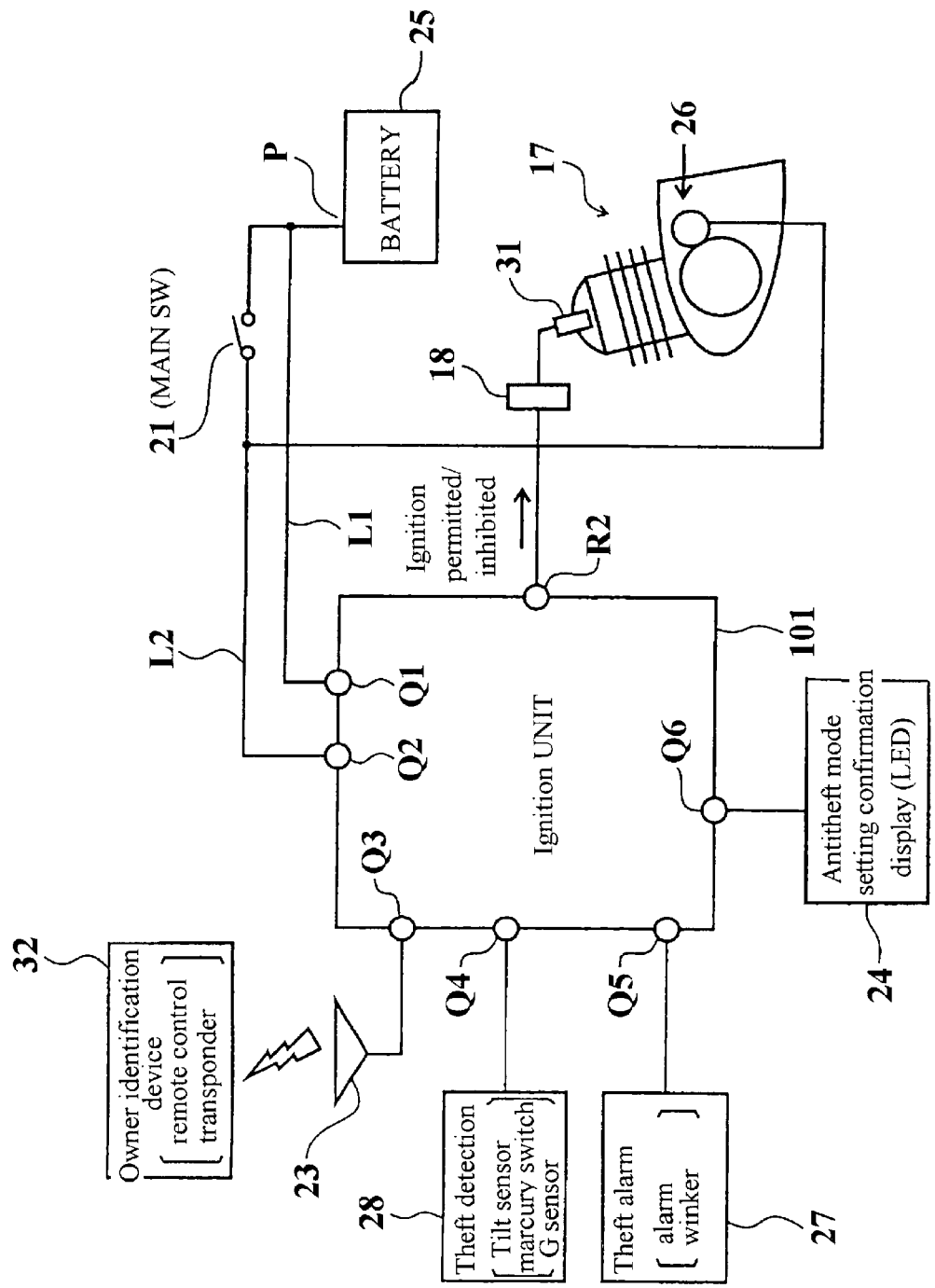
FIG. 5 is a schematic electrical diagram, in part similar to those of FIGS. 2 and 3, but shows the invention and how theft is prevented by avoiding the problems with the prior art type of constructions.
Figure 6:
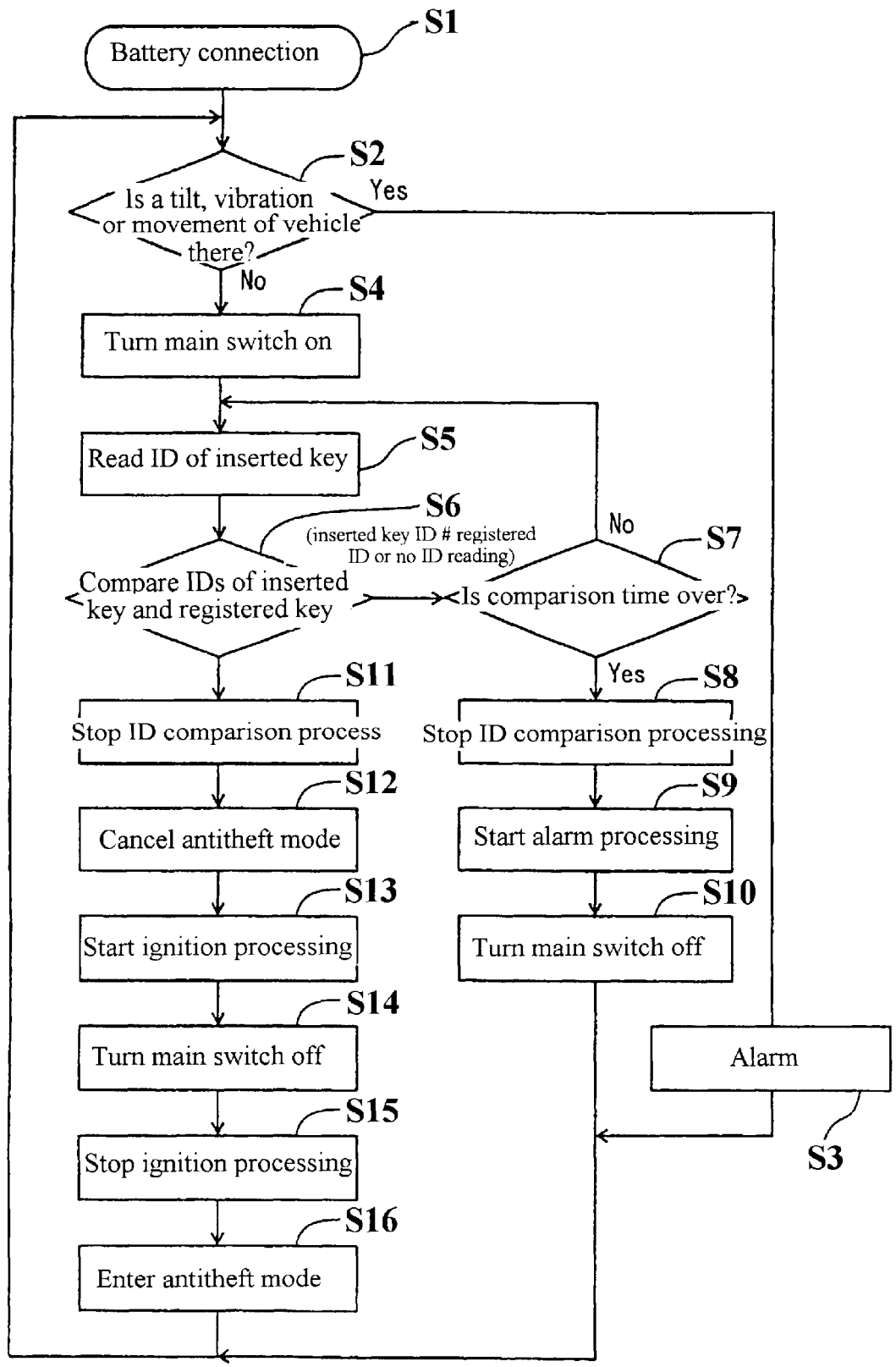
FIG. 6 is a schematic flow control diagram showing the control routine in accordance with the invention.

Basically, the electrical diagram of FIG. 5 also shows the interrelationship between these components as with the prior art constructions. However, it will be seen that the control unit 101 is a unitary unit that controls both the ignition system including the operation of the coil 18 and engine spark plug 31 as well as controlling the starter motor 26. Thus, with this unit, the battery 25 is connected through the main switch 21 to a line L2 that goes to a terminal Q2 of the ignition control unit. A further line L1 bypasses the main switch 21 and directly connects the battery post P to a terminal Q1, which is associated with the antitheft portion of the system. Thus, the line L2 can be directly connected to the starter motor 26 downstream of the main switch 21.

The antenna 23 is connected to the ignition control unit through a terminal Q3 while the theft detection switch or sensor, which may of any type mentioned previously, is connected to a terminal Q4. The unit 101 is connected to the theft alarm 27 through an external terminal Q5 and to the display 24 through an external terminal Q6. A terminal R2 is connected to the coil 18 for controlling the firing of the spark plug 17 in accordance with any desired control strategy.

The CPU 101 also acts under a control routine that separates the ignition control and antitheft controls so that each is performed at a separate time from the other. This permits the use of a simpler and lower cost CPU. In this control routine, the existence of a connection to the battery is determined at the step SI. This connection is via the line L1 as previously noted.

Then, the program moves to the step S2 to determine if the theft detection sensor such as the tilt or vibration sensor 28 indicates that there is an unauthorized movement of the vehicle. If the determination at the step S2 is yes, then the CPU of the combined ignition and antitheft control system 101 actuates the alarm 27 at the step S3.

If, however, at the step S2 there is no indication of theft by the tilt sensor or other vibration sensor 28, the program moves to the step S4. At this step and the next step, it determines if the main switch is turned on by an authorized or registered key. Assuming the main switch is turned on at the step S4, the program moves to the step S5 to read the identification code of the key 32, which has been inserted to turn the main switch 21 on.

If the inserted key is not confirmed to be a registered id or if there is not an indication of any id reading, the program moves to the step S7 to determine if the time for making the comparison set by a timer in the unit 101 has elapsed. If it has, then the program moves to the step S8 so as to stop the id comparison process and then to the step S9 to start the alarm and antitheft process. The program then moves to the step S10 so as to shut off the main switch and to go back through the step S2 to set off the alarm at the step S3. Thus unauthorized use is not possible.

If, however, at the step S6 it is determined that the inserted key is a correct key and one which is registered, then the programs moves to the step S11 so as to stop the id comparison processing. The program then moves to the step S12 so as to cancel the antitheft mode and discontinue this portion of the operation of the CPU of the unit 101.

The program then moves to the step S13 so as to start processing the ignition operation and engine operation is permitted. Thus, the signal is transmitted from the conductor R2 to the coil 18 and spark plug 31 as well as permitting operation of the starter motor. The routine then continues until the main switch is turned off at the step S14. Then the program moves to the step S15 to stop ignition processing and turn off the flow of current to the coil from the terminal R2 of the unit 101. The program then moves to the step S16 to reenter the antitheft mode and the program is ready to repeat for the next authorized user.

Thus, from the foregoing description, it should be readily apparently that the described system employs a single CPU, which avoids the use of external terminals between the CPU for the ignition system and that for the antitheft system as well as simplifying the overall arrangement. Of course, other means can be employed for avoiding the use of external connections that would permit theft and other changes and modifications may be made without departing from the spirit and scope of the invention, as defined by the appended claims.

What is claimed is:

1. A motor vehicle and antitheft system therefore, said motor vehicle having a prime mover, a CPU for controlling the operation of said prime mover, a battery, a main switch located externally of said battery, for connecting said battery to said CPU for effecting its operation, and a theft detection control operated internally of said CPU for preventing said CPU from operating said prime mover even if said main switch is closed unless an authorized user begins operation of the vehicle by being properly identified by said CPU so that the prime mover can not be operated even if external terminal connections are jumped so that antitheft protection is possible even when the CPU is energized.

2. An antitheft unit for a motor vehicle as set forth in claim 1 wherein the prime mover comprises an internal combustion engine having a spark ignition system controlled by an ignition timing function of a CPU.

3. An antitheft unit for a motor vehicle as set forth in claim 2 wherein the main switch controls the flow of electrical power from a battery to the spark ignition system.

4. An antitheft unit for a motor vehicle as set forth in claim 1 wherein a single CPU performs both the prime mover control function and the antitheft function.

5. An antitheft unit for a motor vehicle as set forth in claim 4 wherein the single CPU performs the prime mover control function and the antitheft function at different time periods.

6. An antitheft unit for a motor vehicle as set forth in claim 5 wherein the prime mover comprises an internal combustion engine having a spark ignition system controlled by an ignition timing function of a CPU.

7. An antitheft unit for a motor vehicle as set forth in claim 6 wherein the main switch controls the flow of electrical power from a battery to the spark ignition system.

* * * * *